US008347504B2

(12) United States Patent
Raab et al.

(10) Patent No.: US 8,347,504 B2
(45) Date of Patent: Jan. 8, 2013

(54) REMANUFACTURED FUEL INJECTOR TIP AND FUEL INJECTOR TIP REMANUFACTURING PROCESS

(76) Inventors: Karen Raab, Peoria, IL (US); James D. Sparks, Edelstein, IL (US); Scott A. Johnston, East Peoria, IL (US); Sami El-Sayed, Peoria, IL (US)

( * ) Notice: Subject to any disclaimer, the term of this patent is extended or adjusted under 35 U.S.C. 154(b) by 135 days.

(21) Appl. No.: 12/960,641

(22) Filed: Dec. 6, 2010

(65) Prior Publication Data

US 2011/0073681 A1 Mar. 31, 2011

Related U.S. Application Data

(62) Division of application No. 11/656,193, filed on Jan. 22, 2007, now Pat. No. 7,866,574.

(51) Int. Cl.
*B23P 6/00* (2006.01)
*B23K 20/12* (2006.01)

(52) U.S. Cl. ............ 29/890.121; 29/402.11; 29/402.13; 228/113

(58) Field of Classification Search ............... 29/402.01, 29/402.11, 402.13, 888.011, 890.121, 890.141; 228/113–114; 239/88, 533.2
See application file for complete search history.

(56) References Cited

U.S. PATENT DOCUMENTS

| | | | | |
|---|---|---|---|---|
| 3,384,308 | A | 5/1968 | Cupler, II | |
| 4,601,086 | A | 7/1986 | Gertach | |
| 5,862,991 | A | 1/1999 | Willke et al. | |
| 6,155,504 | A | 12/2000 | Sugimoto et al. | |
| 6,168,099 | B1 | 1/2001 | Hopf et al. | |
| 6,375,792 | B1 | 4/2002 | Fukaya et al. | |
| 6,434,822 | B1 | 8/2002 | Perry et al. | |
| 6,601,300 | B2 | 8/2003 | Hasegawa et al. | |
| 7,984,550 | B2 * | 7/2011 | Jenkel et al. | 29/890.121 |
| 2002/0070296 | A1 | 6/2002 | Perry et al. | |
| 2006/0097075 | A1 | 5/2006 | Goenka et al. | |
| 2006/0280618 | A1 | 12/2006 | Awwad et al. | |
| 2006/0280619 | A1 | 12/2006 | Awwad et al. | |

FOREIGN PATENT DOCUMENTS

| | | |
|---|---|---|
| EP | 1124057 | 8/2001 |
| EP | 1264984 | 12/2002 |
| FR | 779782 | 4/1935 |
| GB | 400836 | 11/1933 |
| WO | 02086309 | 10/2002 |

OTHER PUBLICATIONS

Pending publication of U.S. Appl. No. 11/589,429, filed Oct. 30, 2006; Jenkel et al., Fuel Injector Remanufacturing Method and Remanufactured Fuel Injector.

* cited by examiner

*Primary Examiner* — Alexander P Taousakis

(57) ABSTRACT

A method of manufacturing a fuel injector having high-flow orifices in its tip includes removing a bulb from a fuel injector tip having at least one spray orifice with a first diameter, and friction welding a slug to the fuel injector tip, including forming a fused interface of material of the slug and material of the fuel injector tip. The method further includes modifying the slug subsequent to friction welding the slug to the fuel injector tip, including forming a new bulb from the slug having at least one spray orifice therein with a different diameter than that of the removed bulb. A remanufactured fuel injector, and fuel injector tip, includes an injector tip body having a first tip portion of a first material and a second tip portion of a material compatible for friction welding with the first material. The injector tip body further includes a third tip portion attaching the first tip portion to the second tip portion, the third tip portion including a friction weld formed during remanufacturing of the fuel injector tip.

10 Claims, 6 Drawing Sheets

REMANUFACTURED FUEL INJECTOR TIP AND FUEL INJECTOR TIP REMANUFACTURING PROCESS

CROSS-REFERENCE TO RELATED APPLICATIONS

This patent application is a Divisional of U.S. patent application Ser. No. 11/656,193, filed Jan. 22, 2007.

TECHNICAL FIELD

The present disclosure relates generally to remanufacturing and salvaging, and relates more particularly to an inertia weld remanufacturing process for fuel injector tips having out-of-specification spray orifices.

BACKGROUND

Fuel injectors are integral components of many modern engine systems, and range in application from use in relatively small portable diesel and gasoline engines to very large power generation and marine propulsion systems. The basic function of a conventional fuel injector is to deliver a relatively precise amount of pressurized fuel into a combustion chamber of an engine at a desired timing. The service life of many fuel injectors is relatively long, on the order of at least thousands of hours. This relatively long duty cycle coupled with the relatively severe operating environment and high fluid pressures associated with fuel injection tend to result in wear on various parts of the injector. Over time, the wear experienced by an injector can affect its performance, and under certain circumstances can even render the injector and its associated engine combustion chamber inoperable.

It is common for certain injectors to become internally clogged via relatively viscous petroleum-derived substances. Fuel injector spray orifices may also become at least partially clogged due to carbonized deposits from high temperature combustion products. When an engine system is dismantled for maintenance or rebuild, the injectors are typically removed, their performance evaluated, and the injectors subsequently cleaned and prepared for further service, or at least partially scrapped. Economic losses associated with scrapping fuel injectors and fuel injector parts have long plagued the engine industry.

Another type of fuel injector performance problem which results in scrapping of a large number of fuel injector parts across the industry relates not to clogging and flow restriction, but to the tendency for injector spray orifices to enlarge. Under certain conditions, spray orifices may become enlarged due to fluid erosion of the inner walls of the orifices. This tendency has been shown to be particularly acute with injectors utilizing relatively higher pressures and flow rates, such as are commonly used in certain larger diesel compression ignition engines. In other words, over the course of many hours of operation, fuel sprayed out of the injector spray orifices under high pressure can erode the inner walls of the spray orifices, increasing orifice size and resulting in excess fuel sprayed into the engine cylinder associated with a particular injector.

Certain injectors having a tendency to eventually develop a high flow condition can weigh well over twenty pounds, and be quite expensive, due to the extensive and fairly precise machining used in their manufacture. Thus, there is a substantial need in the industry for a means to salvage components of these relatively large, heavy duty and expensive injectors, in particular the fuel injector tips. Certain earlier attempts at remanufacturing fuel injectors involved scrapping many of the injectors and/or parts where only the injector tips were out of specification, and attaching new tips to remanufactured injector bodies.

The present disclosure is directed to one or more of the problems or shortcomings set forth above.

SUMMARY OF THE DISCLOSURE

In one aspect, the present disclosure provides a method of manufacturing a fuel injector, including removing an end portion of a fuel injector tip having at least one spray orifice therein, the at least one spray orifice having a first diameter. The method further includes friction welding a slug to the fuel injector tip, including forming a fused interface of material of the slug and the material of the fuel injector tip and modifying the slug subsequent to friction welding the slug to the fuel injector tip. Modifying the slug includes forming a new end portion from the slug having at least one spray orifice therein with a diameter different from the first diameter.

In another aspect, the present disclosure provides a method of remanufacturing and salvaging a fuel injector tip, including receiving a fuel injector tip removed from an engine after a service life, the fuel injector tip including an end portion having a plurality of spray orifices with a first average orifice size. The method further includes removing the end portion from the fuel injector tip and replacing the removed end portion with a new end portion that includes a plurality of spray orifices having a second average orifice size different from the first average orifice size. Replacing the removed end portion includes friction welding the slug to the injector tip and forming the new end portion from the slug.

In still another aspect, the present disclosure provides a remanufactured fuel injector tip including an injector tip body comprising a first tip portion of a first material and a second tip portion of a material compatible for friction welding with the first material, the first tip portion having a fuel passage and the second tip portion including a plurality of spray orifices in fluid communication with the fuel passage. The injector tip body further includes a third tip portion, including a friction weld formed during remanufacturing of the fuel injector tip, attaching the first tip portion to the second tip portion and comprising a fused interface of the first material and material of the second tip portion.

DETAILED DESCRIPTION

Figure 1:
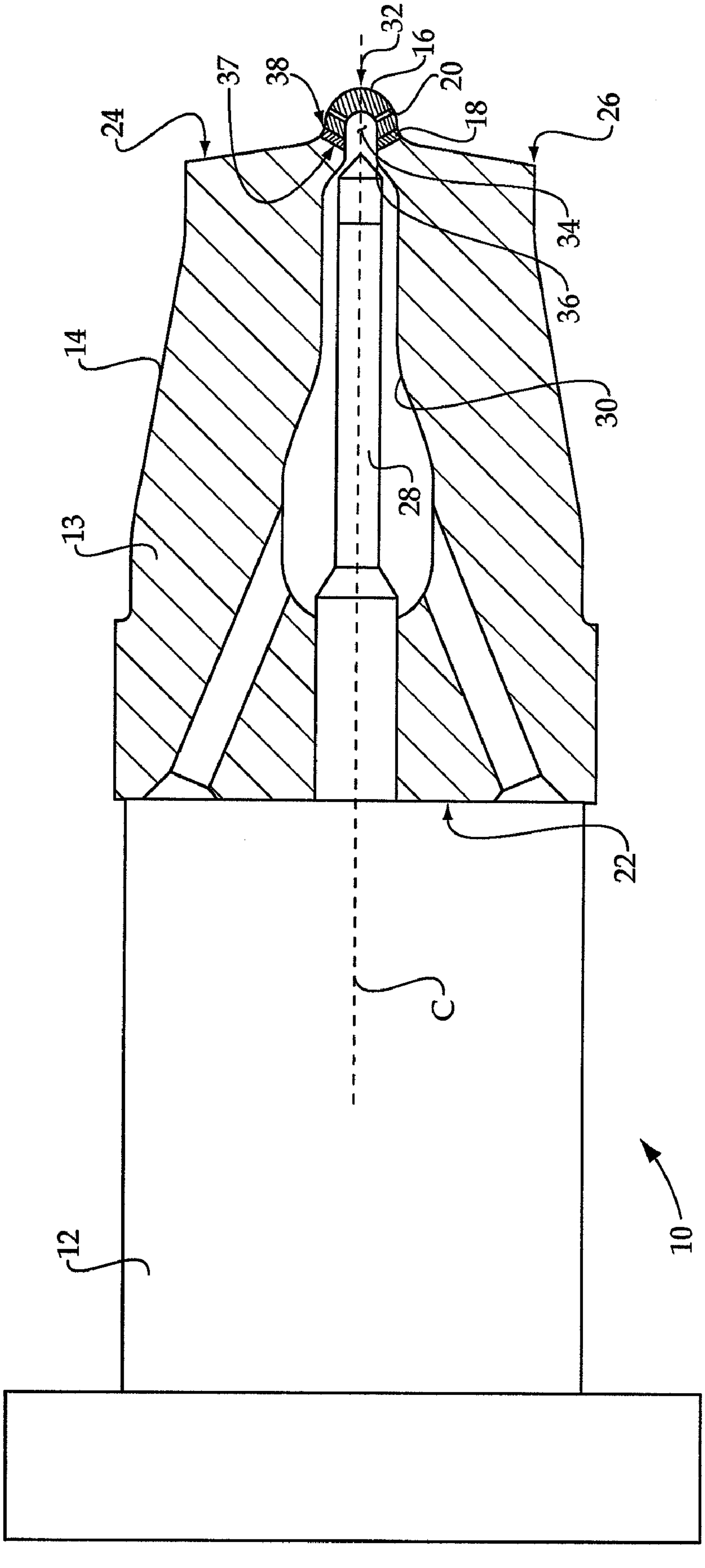
FIG. 1 is a partially sectioned side diagrammatic view of a remanufactured fuel injector according to one embodiment.

Referring to FIG. 1, there is shown a remanufactured fuel injector 10, having an injector body 12 and an injector tip 13 coupled therewith. Injector tip 13 includes a fuel passage 30 extending therein between a first end 22 and a second end 24. A needle valve member 28 is reciprocable within injector tip 13 and a portion of injector body 12, generally within and coaxial with fuel passage 30 and a centerline C of fuel injector 10. Needle valve member 28 may be movable away from and against a seat 36 to control fuel injection in a conventional manner. Injector tip 13 may be understood as having three separate body portions, including a first body portion 14, a second body portion or end portion 16 which may include a bulb 32 having a sac 34 therein and a third body portion 18 attaching first body portion 14 with second body portion 16. At least one, typically a plurality, of spray orifices 20 are disposed in second body portion 16 and may fluidly connect with fuel passage 30 for example via sac 34, to permit spraying of fuel from fuel injector 10 in a conventional manner.

Third body portion 18 may consist of a friction weld, for example, formed via inertia welding, and comprising a fused interlace of material of first tip portion 14 and second tip portion 16. Third body portion 18 may be formed during a manufacturing or remanufacturing process for injector tip 13 such that an original end portion having, for example, a defective bulb 32 may be replaced with a new bulb, as described herein. To this end, first body portion 14 may comprise a first material and second body portion 16 may comprise another material suitable for friction welding with the first material. The fused interface of material of the respective tip portions 11 and 16 may consist of material which reaches a molten or highly malleable state during inertia welding the respective tip portions 14 and 16 together.

Third body portion 18 thus includes some of each of the materials of first and second body portions 14 and 16, the extent of mixing of the materials depending upon the particular friction welding process parameters, but will typically not include a filler material between body portions 14 and 16. Nevertheless, it should be understood that in all embodiments of the present disclosure, a third body portion consisting of a friction weld having the fused interface of materials of each of body portions 14 and 16 will be present.

In many embodiments, it will be desirable to use identical materials for each of first and second body portions 14 and 16 to render a remanufactured fuel injector having properties and operating specifications as close as practicable to an originally manufactured fuel injector, as well as to facilitate joining portions 14 and 16 together. The present disclosure is not limited to identical materials for the respective body portions, however. Those skilled in the art will appreciate that friction welding processes may be capable of joining dissimilar materials, and factors such as cost and availability may make the use of different materials for body portions 14 and 16 desirable in some instances. In one embodiment, first body portion 14 and second body portion 16 will each consist of 52100 steel. Other well-known and/or proprietary metallic materials may be used for either or both of body portions 14 and 16, so long as the materials are amenable to joining via friction welding.

It will further be recognized that a wide variety of injector types are known in the art, some having bulbs and/or sacs, and some not having bulbs and/or sacs, for instance. Further variation in design is well known in regard to the number, size, angle, distribution, etc. of spray orifices 20. The present disclosure contemplates remanufacturing any fuel injector and fuel injector tip wherein one body portion having at least one spray orifice may be removed from another body portion, then replaced with yet another body portion already having or amenable to forming at least one spray orifice therein via the presently described process.

Third tip portion 18 further includes a first side 37 and a second side 38. In the embodiment shown in FIG. 1, it may be noted that seat 36 is disposed in first body portion 14, on the first side 37 of third tip portion 18, whereas bulb 32 is disposed predominantly in second body portion 16, on the second side 38 of third tip portion 18. Thus, in the FIG. 1 embodiment bulb 32 may consist at least partially of material which does not include welded material, and may consist solely of unwelded material of body portion 16, whereas seat 36 may be formed at least partially from unwelded material of portion 14, and may consist solely of unwelded material.

In certain embodiments, it may be desirable to form the third tip portion 18 at a location that does not require further machining to recreate seat 36, hence the location of seat 36 in the FIG. 1 embodiment may be on the first side 37 of third tip portion 18, and entirely within first body portion 14. Likewise, it may be undesirable to machine friction welded material or material affected by the heat of friction welding, as such material may have different properties than its parent material. Nevertheless, a sufficiently large connection zone between first and second tip portions 14 and 16 having sufficient strength is also a consideration. Thus, it will be recognized that a plurality of factors bear on the selection of a location for positioning third tip portion 18 to provide a weld having the desired properties. In the embodiment of FIG. 1, third tip portion 18 comprises a generally annular weld that is located between a centerline C of fuel injector 10 and an outer periphery 26 of an end surface 24 of fuel injector 10, spaced inwardly from outer periphery 26. In other embodiments, described herein, the relative location of third tip portion 18 may differ.

It may further be desirable to provide a third tip portion 18 that includes a relative tensile strength greater than a tensile strength of either of first tip portion 14 and second tip portion 16. Friction welding tends to result in relatively harder welded material than the parent materials joined together, and can in some instances result in relatively stronger welded material than either of the parent materials joined together, depending upon variation in known welding parameters. The specific welding parameters which may be varied during friction welding first tip portion 14 to second tip portion 16 include relative rotational speed between the parts to be welded, duration of rotating the parts relative to one another when in contact with one another, and axial force between the parts. Preheating of one or more of the parts to be welded, as well as post-heating techniques may also be used.

Figure 5:
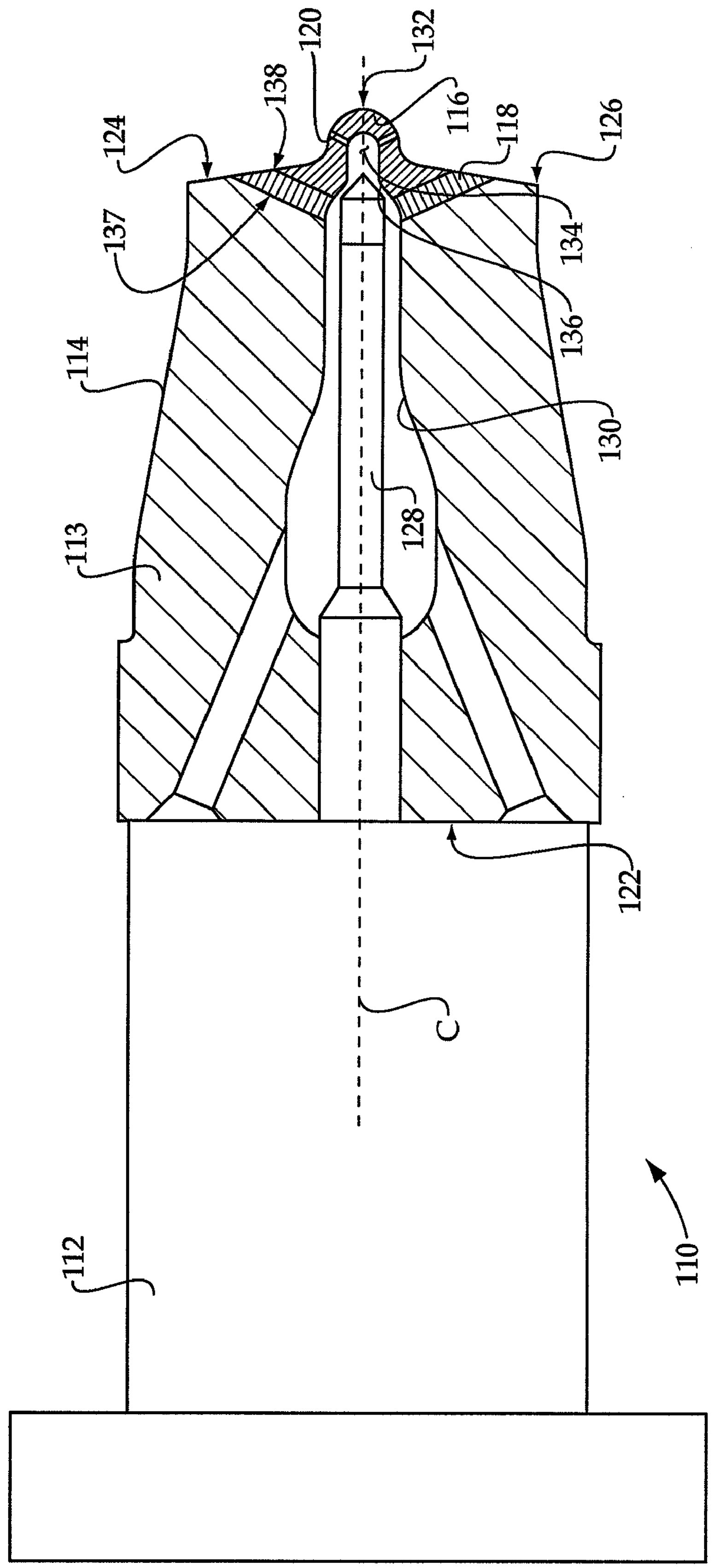
FIG. 5 is a partially sectioned side diagrammatic view of a remanufactured fuel injector according to another embodiment.

Turning to FIG. 5, there is shown a remanufactured fuel injector 110 according to another embodiment of the present disclosure, wherein similar numerals are used to identify features similar to those depicted in FIG. 1. Injector 110 differs from injector 10 primarily in the relative location of third tip portion 118. Rather than welding a second tip portion 116 to a first tip portion 114 at a location between its seat 136 and orifices 120, in the FIG. 5 embodiment, third tip portion 118 is positioned to include at least a portion of seat 136, and in certain embodiments may include all of seat 136. Third tip portion 118 includes a weld having a generally annular configuration, disposed between a centerline C of injector 110 and an outer periphery 126 of an end surface 124 of injector 110 and spaced inwardly from outer periphery 126. The relative size of third tip portion 118, and hence the size of the friction weld, as well as the inclusion of at least portions of seat 136 within third tip portion 118 distinguishes injector 110 from injector 10. It may also be noted that bulb 132 is located on a second side 138 of third tip portion 118 and seat 136 is located at least partially on the second side 138 of third tip portion 118.

Figure 6:
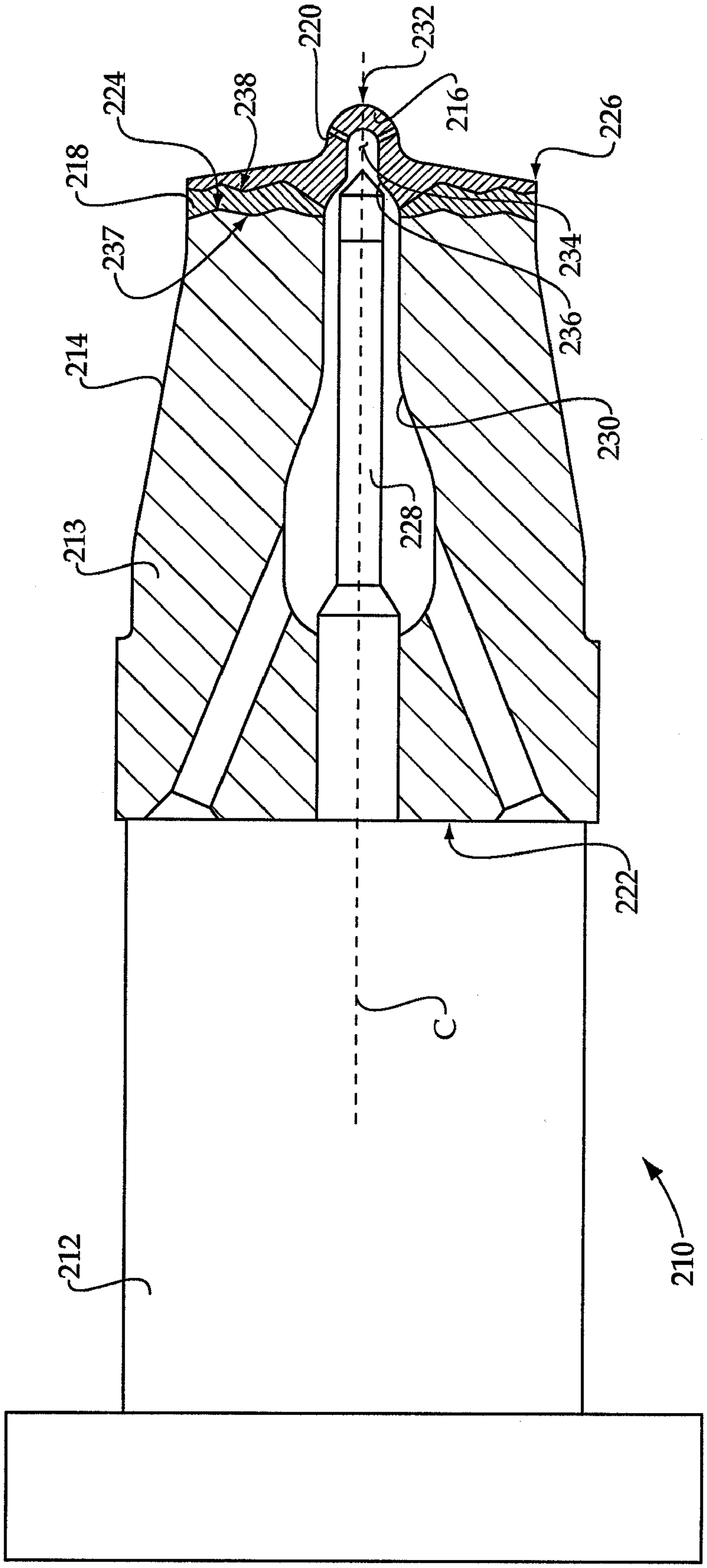
FIG. 6 is a partially sectioned side diagrammatic view of a remanufactured fuel injector according to still another embodiment.

Turning to FIG. 6, there is shown a fuel injector 210 having a tip 213 according to still another embodiment of the present disclosure, wherein similar numerals are used to identify features similar to those depicted in FIGS. 1 and 5. Injector 210 differs from the previously described embodiments primarily in that third tip portion 218 is attached across substantially the entirety of an end of the injector tip 213. In particular, an end surface 224 of a first tip portion 214 is joined to third tip portion 218, in turn joined to second tip portion 216. In injector 210, all of a seat 226 will typically be located in second tip portion 216, but might also include portions within third body portion 218.

INDUSTRIAL APPLICABILITY

As alluded to above, one specific remanufacturing application of the present disclosure relates to remanufacturing fuel injectors known as "high-flow" fuel injectors, or having "high-flow" tips. Spray orifices in a fuel injector tip, commonly located in a bulb, can experience fluid erosion of their inner walls, enlarging a diameter of the orifices between their inner walls from a desired diameter and thus increasing the relative size and flow rate of the orifices. Where one or more spray orifices of an injector has eroded thusly, the overall average orifice diameter and, hence, flow rate of the injector may be increased, even if certain orifices are not at a high flow state. Excess fuel flow through one or more orifices in a fuel injector tip can result in poor fuel economy in an associated engine, increased unburned hydrocarbons in the engine exhaust and potentially other problems. Many engine operating strategies rely for their success upon relatively precise control over fuel injection quantities and, thus, even small deviations from operating specifications in a fuel injector can compromise engine performance.

Although the following description emphasizes a specific remanufacturing process for injector 10 and injector tip 13, it should be understood that the principles and procedures set forth herein are generally applicable to all embodiments of the present disclosure, except where otherwise indicated. Remanufacturing a fuel injector such as fuel injector 10 may take place after receiving a fuel injector and/or fuel injector tip 13 removed from an engine after a service life. As used herein, "service life" is not intended to mean a specific length of time, as certain engines and their associated components such as fuel injectors may be dismantled for rebuild or remanufacturing after varying periods of service, depending upon the operating conditions, the type of engine, performance status, etc. In many instances, a particular engine may be removed from service and its components sent out for remanufacturing for reasons unrelated to fuel injector performance. However, remanufacturing of fuel injectors could be most convenient at the time that the engine is removed from service, even if injector operation has not degraded to the point of noticeably compromising engine performance. In other instances, degraded performance could indicate that removing the injectors for remanufacturing is appropriate.

When a particular fuel injector is received for remanufacturing from an end user or other entity, its operation will typically be evaluated, including assessing the relative flow rate and/or orifice size/diameter in the injector's tip. Not all spray orifices will necessarily experience fluid erosion at the same rate, and it is thus common to receive fuel injector tips for remanufacturing having some spray orifices which have a diameter and flow rate that is within specifications, while certain of the other spray orifices have fluid eroded to out-of-specification conditions. In any event, where the average spray orifice diameter/flow rate of a given fuel injector tip is greater than a desired diameter/flow rate, the fuel injector tip may be in a high-flow state and thus appropriate for remanufacturing. In still further versions of the present disclosure, injectors having a low-flow state, for example where spray orifices are blocked by material not practicably removed, such as extremely hard carbonized deposits, might be remanufactured as described herein. Still other embodiments are contemplated wherein a fuel injector tip has some defect made apparent before being placed in service which makes it amenable to the present remanufacturing process. Thus, the present disclosure is not strictly limited to remanufacturing fuel injector tips having a high-flow state or even to injectors and tips which have ever been used apart from testing. A primary application of the present strategy, however, is contemplated to be remanufacturing high-flow fuel injectors and fuel injector tips, as further described herein.

Figure 2:
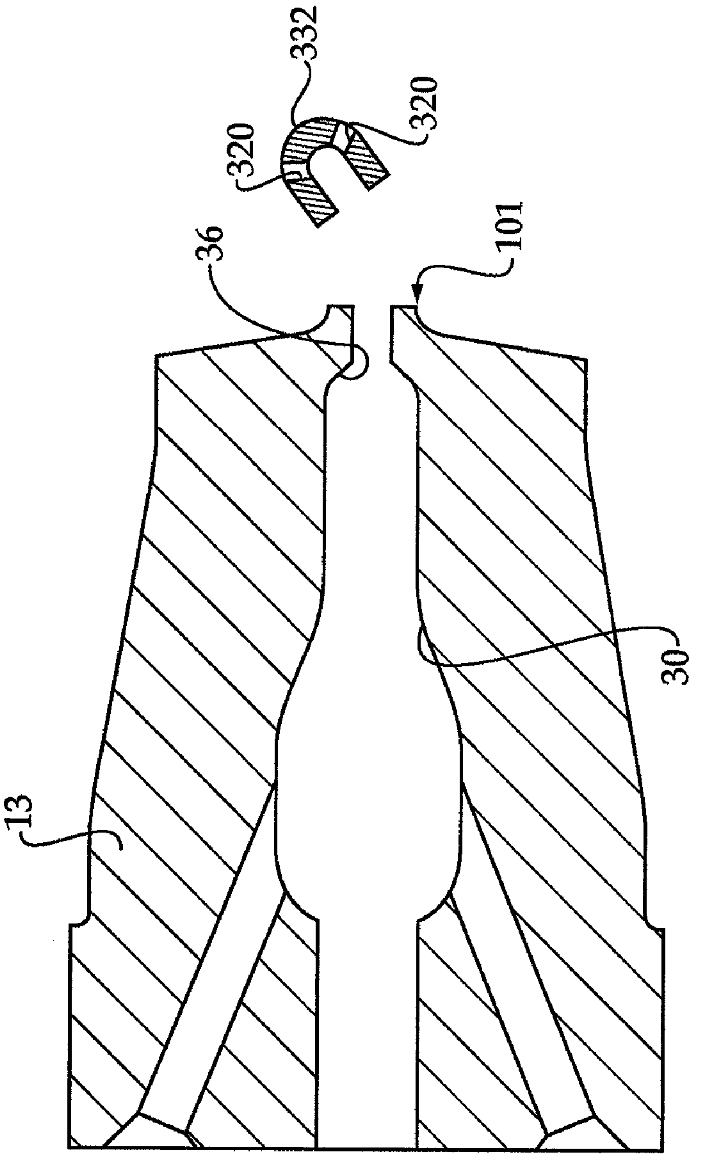
FIG. 2 is a sectioned side view of a fuel injector tip shown at one stage of a remanufacturing process.

Thus, fuel injector tip 13 will typically be amenable to remanufacturing where at least one of its existing spray orifices is out-of-specification, for example such that the average orifice size in injector tip 13 prior to remanufacturing is larger than a desired orifice size for a particular line of fuel injectors. In certain embodiments, however, the average orifice size or flow rate of the existing orifices could be smaller/lower than a desired size and/or flow rate. Flow rate tests or some other diagnostics may be used to determine that at least one existing spray orifice is at a high-flow state, for example. Turning to FIG. 2, there is shown fuel injector tip 13 with its original bulb 332 removed. The original bulb 332 includes spray orifices 320, at least one of which is out-of-specifications. Bulb 332 may be cut from injector tip 13, removed via grinding, or removed by any other suitable process. In the embodiment shown in FIG. 2, only bulb 332 is removed, rather than additional material of injector tip 13, leaving an annular region 101 upon injector tip 13.

Figure 3:
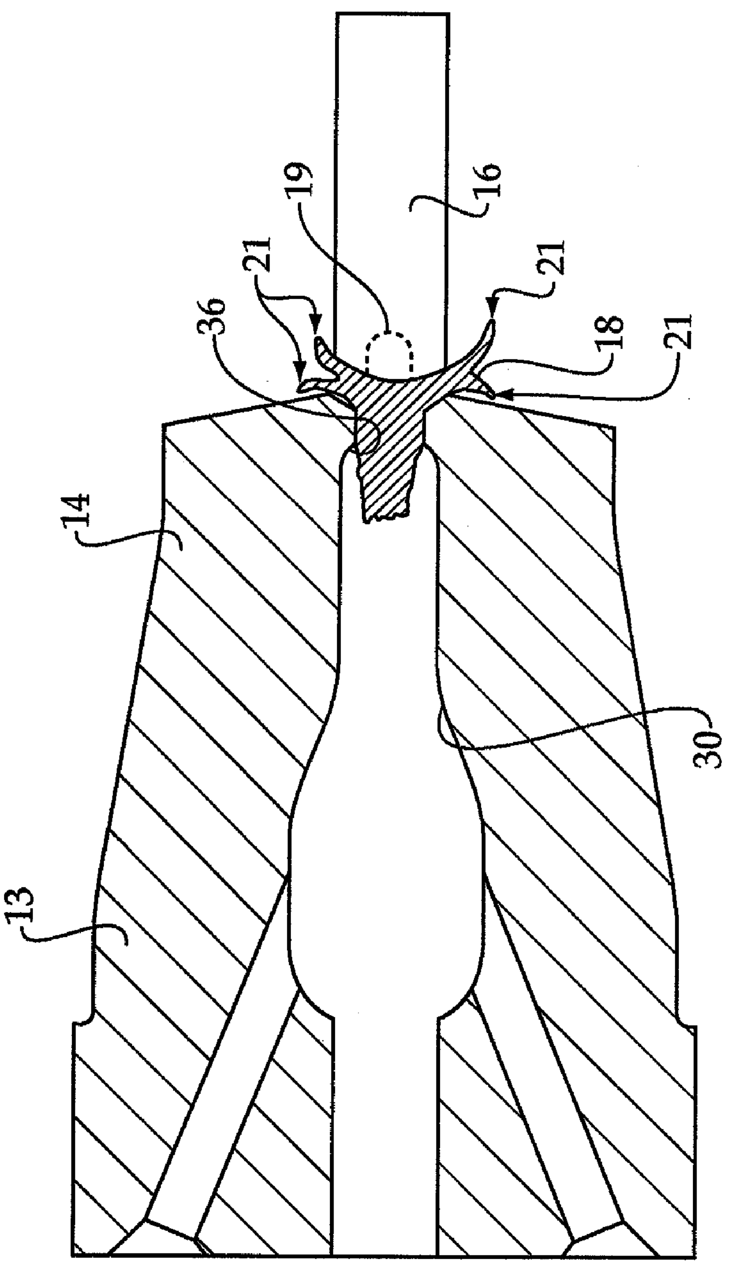
FIG. 3 is a partially sectioned side view of a fuel injector tip shown at another stage of a remanufacturing process.

Following removal of bulb 332, a new bulb may be formed in its place, approximately in the same region 101 of injector tip 13 from which bulb 332 is removed. Turning to FIG. 3, there is shown injector tip 13 at another stage of remanufacturing, wherein a slug 16 is shown attached to injector tip body portion 14 via a friction weld 18. Friction welding slug 16 to injector tip 13 will generally take place by providing relative rotation between slug 16 and injector tip 13, then contacting the components while subjected to axial force. Inertia welding is a variation of friction welding, and relies upon the use or an additional mass coupled with at least one of the rotating components whose rotational inertia provides energy for rotating the components while in contact with one another, and will provide a practical implementation strategy. Slug 16 consists of material attached to injector tip 13 which may subsequently be reduced in length and diameter and machined to form a new bulb 32, or otherwise fashioned to provide spray orifices 20 for eventual returning of injector 10 to an operational state. Third tip portion 18 is shown generally in the configuration which its constituent material may have prior to machining to form the new bulb 32. Weld flash 21 will likely intrude into fuel passage 30, and curl outwardly from the region at which slug 16 is attached to first body portion 14. During typical friction welding, the materials of slug 16 and first body portion 14 will form a fused interface.

Following the friction welding process, weld flash 21 is subsequently removed, by any suitable machining process, and slug 16 machined down to provide a desired shape for bulb 32. Depending upon the location at which slug 16 is attached, a new seat 36 may be formed, by any suitable machining process. New spray orifices 20 may also be formed in injector tip 13 via any suitable process. The one or more new spray orifices 20 may be understood as "normal flow"

orifices, having a diameter corresponding to a desired flow rate for injector 10, as determined by the average diameter of the new orifices. In one embodiment, a longitudinal hole 19 may be formed in slug 16 prior to friction welding to injector tip 13, as shown in FIG. 3, although its use is not critical. Welding flash 21 may intrude into hole 19 during friction welding, ultimately affecting the characteristics of third tip portion 18 in certain embodiments.

Figure 4:
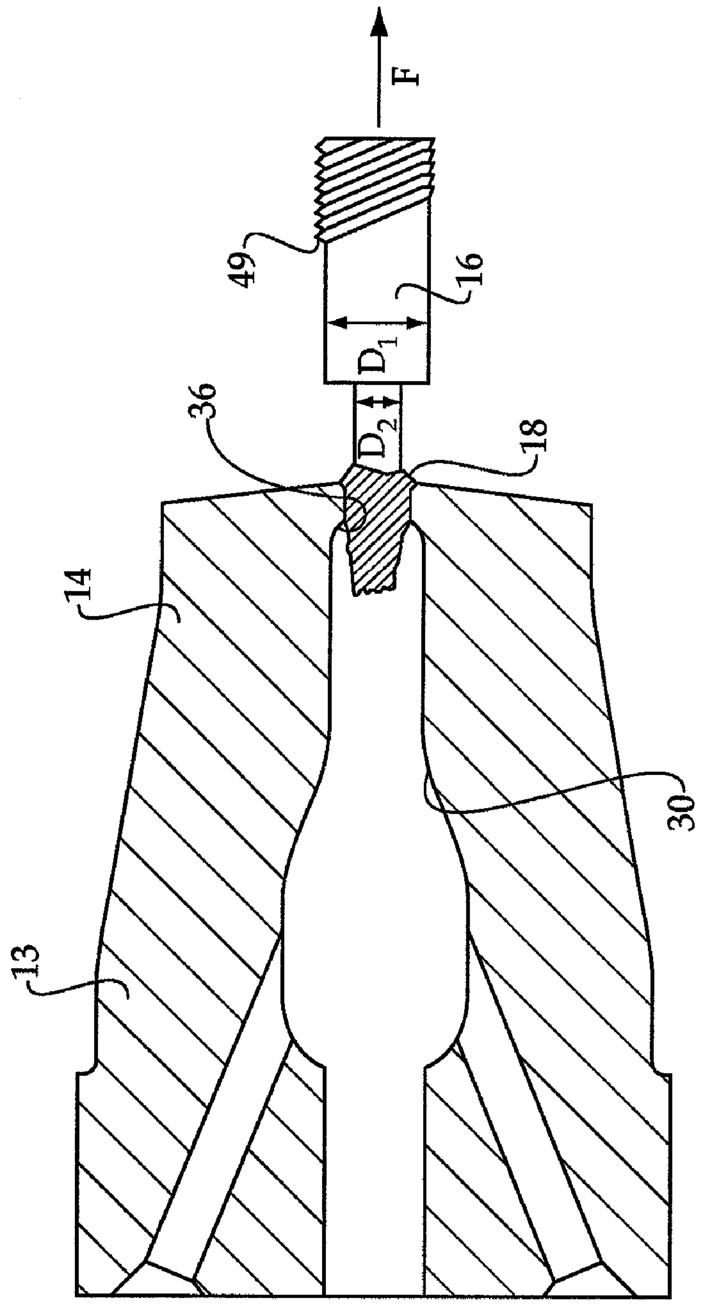
FIG. 4 is a partially sectioned side view of a fuel injector tip modified for strength validation, according to one embodiment.

The size of the slug selected for friction welding will be selected based on a variety of factors. The desired size of third tip portion 18 will generally dictate a minimum diameter for the slug. In general, a relatively larger fused interface of material attaching first and second tip portions 14 and 16 will provide greater strength, however, removing relatively larger amounts of material from first tip portion 14 to provide for a larger weld may be relatively more labor intensive. In addition, relatively larger slugs will tend to require more extensive post-welding machining to form a new bulb, and also result in greater material waste. Referring to FIG. 4, in a first example, a slug having a diameter $D_1$ of about 10.5 millimeters may be welded to injector tip 13 at a weld interface having a similar diameter. A portion of the slug may then be machined to a second diameter $D_2$, reducing its diameter by a factor of up to about one-half, for example to 5.36 millimeters, a dimension corresponding to the diameter of a fuel injector bulb to be formed. Tensile strength of the slug and injector tip combinations may be validated, for example, by forming threads 49 in slug 16 attached to injector tip 13, then applying a load thereon, as indicated by arrow F in FIG. 4. A desired tensile strength for a remanufactured fuel injector tip may be determined based on the theoretical stresses the injector tip is likely to encounter in an operating environment.

The general friction welding process for injectors 110 and 210 will be similar to that described with regard to injector 10, but with certain differences. Injectors 110 and 210, for example, may be remanufactured using relatively larger diameter slugs to account for the relatively larger diameter of the welded third body portions 118 and 218, respectively. In addition, rather than removing only the old bulb in anticipation of forming the new bulb, relatively larger quantities of material will be removed from injectors 110 and 210. Machining of the slugs used in remanufacturing injectors 110 and 210 will generally require the removal of a relatively larger amount of material to create bulbs 132, 232, having a desired diameter. Additional processing steps will be necessary if and when seats 126 and 226 are either removed or modified in preparation for or during the friction welding process. In all cases, finish grinding may be used to produce the desired bulb configuration.

Returning to the specific example of injector 10, once machining of fuel injector tip 13 is complete, with new orifices formed therein, and a desired bulb shape and surface finish created, tip 13 may be reattached to injector body 12, tested for operation within desired specifications and returned to service. Certain fuel injectors commonly have individual parts matched with other parts prior to assembly to achieve desired or optimal performance. Tolerances in manufactured fuel injector components can affect operation, and it is thus often desirable to match individual components having certain characteristics with other components having similar or compensatory characteristics. In other words, a deviation from ideal specifications in a first component such as injector body 12 due to manufacturing tolerances may be compensated for by deviations from specifications in a second component such as injector tip 13. By remanufacturing fuel injector components as described herein, the need for identifying components having compensatory specifications may be reduced, as the injector tip initially removed from an injector body may be returned to service with the same injector body.

The present disclosure is applicable without limitation to materials, injector style, etc., for reasons set forth herein. It is contemplated, however, that economic justification for salvaging fuel injector parts may tend to be greatest for relatively large, expensive fuel injectors. The prior state of the art remanufacturing of certain fuel injectors involved scrapping large numbers of injector parts, in particular tips, resulting in substantial economic inefficiency. The present disclosure promises to provide a 50% or greater cost reduction per tip over replacing high-flow injector tips with new tips in a remanufactured fuel injector. Rather than scrapping up to one third of the injector tips received for remanufacturing because of high-flow failure, and replacing the scrapped tips with new ones, many more of the tips may be returned to service than was previously attainable, or at least practicable.

The present description is for illustrative purposes only, and should not be construed to narrow the breadth of the present disclosure in any way. Thus, those skilled in the art will appreciate that various modifications might be made to the presently disclosed embodiments without departing from the intended spirit and scope of the present disclosure. For instance, while it is contemplated that fuel injector tips will often be returned to service in an application identical to that in which they previously operated, the present disclosure is not thereby limited. Thus, while a new bulb will typically be formed with structural and functional characteristics as similar as practicable to those of the original bulb, different spray orifice configurations, number, etc. might be used in the new bulb. Moreover, rather than coupling remanufactured fuel injector tips with remanufactured injector bodies, in some embodiments new injector bodies might be attached to remanufactured injector tips. Other aspects, features and advantages will be apparent upon an examination of the attached drawings and appended claims.

We claim:

1. A method of remanufacturing a fuel injector comprising:

removing an end portion of a fuel injector tip having at least one spray orifice, the at least one spray orifice having a first diameter;

friction welding a slug to the fuel injector tip, including forming a fused interface of material of the slug and material of the fuel injector tip; and modifying the slug subsequent to friction welding the slug to the fuel injector tip, including forming a new end portion for the fuel injector tip from the slug having at least one spray orifice therein with a diameter different from the first diameter.

2. The method of claim 1 wherein:

removing an end portion comprises removing a bulb from the fuel injector tip having at least one high-flow spray orifice therein;

friction welding the slug to the fuel injector tip includes inertia welding the slug to the fuel injector tip approximately in a region of the tip from which the bulb is removed; and forming a new end portion comprises forming a new bulb for the fuel injector tip having a plurality of normal flow spray orifices therein.

3. The method of claim 2 wherein modifying the slug subsequent to friction welding the slug to the fuel injector tip further comprises reducing a diameter of the slug prior to forming the plurality of normal-flow spray orifices therein.

4. The method of claim 3 wherein forming a new bulb comprises forming the normal-flow spray orifices in the slug when the diameter of the slug has been reduced by a factor of up to about two.

5. The method of claim 4 further comprising validating an injector tip tensile strength at least in part by cutting threads in the slug, and applying a load to the slug via the threads.

6. The method of claim 2 wherein friction welding a slug to the injector tip comprises inertia welding a slug having a longitudinal hole therein to the injector tip.

7. A method of remanufacturing and salvaging a fuel injector tip comprising:

receiving a fuel injector tip removed from an engine after a service life, the fuel injector tip including an end portion having a plurality of spray orifices therein with a first average orifice size;

removing the end portion from the fuel injector tip; and replacing the removed end portion with a new end portion that includes a plurality of spray orifices having a second average orifice size different from the first average orifice size, including friction welding a slug to the injector tip and forming the new end portion from the slug.

8. The method of claim 7 wherein:

removing the end portion comprises removing a bulb from the fuel injector tip;

friction welding a slug to the injector tip comprises forming an inertia weld that attaches the slug to the fuel injector tip and includes a fused interface of material of the fuel injector tip and material of the slug; and replacing the removed end portion includes replacing the new end portion with a new end portion having a plurality of spray orifices having a second average orifice size smaller than the first average orifice size, and forming the new end portion comprises forming a new bulb from the slug, including reducing a diameter and reducing a length of the slug.

9. The method of claim 8 wherein forming an inertia weld comprises positioning the inertia weld at a location spaced radially inward from an outer periphery of an end of the injector tip.

10. The method of claim 8 wherein forming an inertia weld comprises forming the inertia weld at an outer periphery of an end of the injector tip.

* * * * *